(12) United States Patent
Imai

(10) Patent No.: US 8,356,999 B2
(45) Date of Patent: Jan. 22, 2013

(54) LEVER-TYPE CONNECTOR

(75) Inventor: Yuujirou Imai, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 407 days.

(21) Appl. No.: 12/707,019

(22) Filed: Feb. 17, 2010

(65) Prior Publication Data
US 2010/0226716 A1   Sep. 9, 2010

(30) Foreign Application Priority Data
Mar. 4, 2009   (JP) ................................ 2009-050705

(51) Int. Cl.
*H01R 13/62* (2006.01)
(52) U.S. Cl. ........................................ 439/157; 439/372
(58) Field of Classification Search .................. 439/157, 439/372
See application file for complete search history.

(56) References Cited

U.S. PATENT DOCUMENTS

| | | | | |
|---|---|---|---|---|
| 4,152,038 A * | 5/1979 | Inouye et al. | .................. | 439/157 |
| 5,564,935 A * | 10/1996 | Yagi et al. | ...................... | 439/157 |
| 5,873,745 A | 2/1999 | Duclos et al. | | |
| 6,375,481 B2 * | 4/2002 | Zweigle | ......................... | 439/157 |
| 6,685,489 B1 * | 2/2004 | Rubenstein et al. | .......... | 439/157 |
| 7,241,154 B1 * | 7/2007 | Mauney et al. | ................ | 439/157 |
| 7,726,988 B2 * | 6/2010 | Martin | .......................... | 439/157 |
| 2004/0242039 A1 * | 12/2004 | Griffin | ........................... | 439/157 |
| 2007/0207647 A1 * | 9/2007 | Imai et al. | ...................... | 439/157 |
| 2011/0124213 A1 * | 5/2011 | Dekoski | ......................... | 439/157 |

* cited by examiner

*Primary Examiner* — Victor MacArthur
(74) *Attorney, Agent, or Firm* — Gerald E. Hespos; Michael J. Porco; Matthew T. Hespos

(57) ABSTRACT

A lever-type connector has a female housing (30) that can be connected with and separated from a male housing (10) as a lever (50) is rotated. The lever-type connector has first and second cam pins (32, 33). A first gear (51) is rotated as the lever (50) is rotated and has a first cam groove (54) engageable with the first cam pin (32). A second gear (61) is rotated as the first gear (51) is rotated and has a second cam groove (64) engageable with the second cam pin (33). A width of the first cam groove (54) in a direction orthogonal to a moving direction of the first cam pin (32) exceeds the outer diameter of the first cam pin (32) in conformity with a backlash (S) between the two gears (51, 61). A width of the second cam groove (64) in a direction orthogonal to a moving direction of the second cam pin (33) is substantially equal to the outer diameter of the second cam pin (33).

20 Claims, 15 Drawing Sheets

LEVER-TYPE CONNECTOR

BACKGROUND OF THE INVENTION

1. Field of the Invention

The invention relates to a lever-type connector including two shaft gears.

2. Description of the Related Art

U.S. Pat. No. 5,873,745 and FIGS. 12 to 16 herein show a lever-type connector with a female housing 1F that can be connected with and separated from a male housing 1M as a lever is rotated. FIGS. 12 and 13 show the housings 1F, 1M during a connecting operation, and FIGS. 14 to 16 show the housings 1F, 1M during a separating operation. The connector of FIGS. 12 to 16 also has a lever 4. A first gear 2L is formed integrally on the lever 4 and a second gear 2R is engaged with the first gear 2L. The first gear 2L rotates with the lever 4 and causes the second gear 2R to rotate.

A first cam groove 3L is formed in the first gear 2L and a second cam groove 3R is formed in the second gear 2R. The first and second cam grooves 3L and 3R are arranged symmetrically with respect to a plane of symmetry orthogonal to a plane passing rotation shafts of the gears 2L, 2R and parallel with a connecting direction of the two housings 1F, 1M. A first cam pin 5L is engageable in the first cam groove 3L, and a second cam pin 5R is engageable in the second cam groove 3R. The cam grooves 3L, 3R have substantially the same width as the outer diameters of the cam pins 5L, 5R.

The cam pins 5L, 5R are introduced into the entrances of the cam grooves 3L, 3R, as shown in FIG. 12, at the time of connecting the housings 1F, 1M. The lever 4 then is rotated and causes the gears 2L, 2R to rotate. Surfaces of the cam grooves 3L, 3R distant from the rotation shafts engage the corresponding cam pins 5L, 5R and create a cam action that pulls the two housings 1F, 1M toward each other and into the properly connected state shown in FIG. 13.

A play or backlash 6 is set between the teeth of the gears 2L, 2R so that the gears 2L, 2R can operate smoothly operate. Rotation of the lever 4 at the start of separating the two housings 1F, 1M causes the first gear 2L to rotate clockwise by as much as the backlash 6 without causing a corresponding rotation of the second gear 2R, as shown in FIG. 14. Thus, a surface of the first cam groove 3L close to the rotation shaft engages the first cam pin 5L and only the first cam pin 5L is separated slightly. On the other hand, the second cam pin 5R has not started separating yet. Thus, the separation of the first cam pin 5L constantly precedes between the two housings 1F, 1M and the two housings 1F, 1M interfere with each other, thereby deteriorating lever operability.

Specifically, the second cam pin 5R interferes with an inner wall of the second cam groove 3R, as shown in FIG. 15, if the first cam pin 5L is arranged properly in the first cam groove 3L, and the first cam pin 5L interferes with an inner wall of the first cam groove 3L, as shown in FIG. 16, if the second cam pin 5R is arranged properly in the second cam groove 3R. In short, one of the two cam pins 5L, 5R inevitably interferes with the cam groove, and lever operability is deteriorated in either case.

The invention was developed in view of the above situation and an object thereof is to obtain good lever operability at the time of connecting and separating two housings.

SUMMARY OF THE INVENTION

The invention relates to a lever-type connector with a first housing that can be connected with and separated from a second housing by rotating a lever. First and second cam pins project from the first housing and first and second gears are mounted rotatably in the second housing. The gears rotate as the lever is rotated and cam grooves associated with the respective gears each engage with one of the cam pins. The width of the first cam groove in a direction orthogonal to a moving direction of the first cam pin exceeds the outer diameter of the first cam pin in conformity with a backlash between the two gears. However, the width of the second cam groove in a direction orthogonal to a moving direction of the second cam pin is substantially equal to the outer diameter of the second cam pin.

Only the first gear is rotated by as much as the backlash upon reversing the lever operation. However, the width of the first cam groove exceeds the outer diameter of the first cam pin in conformity with the backlash. Thus, both cam pins and both cam grooves can be engaged at the same time and the two housings can be connected and separated in parallel postures. Therefore, good lever operability can be obtained by avoiding interference of the two housings.

The outer diameters of the both cam pins may be equal. With this construction, the first cam groove may be wider than the second cam groove.

The cam grooves may have connection surfaces to be engaged with the corresponding cam pins when connecting the two housings. The cam grooves also may have separating surfaces to be engaged when separating the two housings. The connection surfaces may be arranged substantially symmetrically with respect to a plane of symmetry orthogonal to a plane passing rotation shafts of both gears and/or parallel to a connecting direction of the two housings and/or the both separation surfaces may be arranged substantially symmetrically with respect to the plane of symmetry at the time of separating the two housings.

The arrangement of the cam pins symmetrically with respect to the plane of symmetry ensures that the cam pins and the cam grooves engaged in a well-balanced manner.

The separation surfaces may not be symmetrical with respect to the plane of symmetry when mounting the gears and/or when connecting the housings.

The first gear may have first teeth arranged successively in a first azimuthal direction from a first entrance of the first cam groove and the second gear may have second teeth arranged in a second azimuthal direction from a second entrance of the second cam groove.

At least one first tooth adjacent to the first entrance may have a shorter radial projecting distance than another first tooth and/or at least one second tooth adjacent to the second entrance may have a shorter radial projecting distance than the another second tooth.

The short first and/or second teeth may substantially face a back wall of an accommodation space of the housing when the housings are connected.

The lever may be formed integral to or unitary with the first gear.

The first and second gears may be substantially symmetrical with respect to a plane of symmetry orthogonal to a plane that includes rotation shafts of both gears and/or in parallel to the connecting direction of the two housings.

A stopper may be provided for stopping rotation of the first gear and preferably projects at one end of a straight part of the outer periphery of the first gear. Thus, good lever operability can be obtained while connecting and separating the housings.

These and other features of the invention will become more apparent upon reading the following detailed description of preferred embodiments and accompanying drawings.

DETAILED DESCRIPTION OF THE PREFERRED EMBODIMENTS

A lever-type connector in accordance the invention is described with reference to FIGS. 1 to 11. The lever-type connector of this embodiment has a male housing 10, a female housing 30 and a lever 50. The lever 50 is mounted rotatably to the male housing 10, and the male housing 10 can be connected with and/or separated from the female housing 30 as the lever 50 is displaced. In the following description, ends of the two housings 10, 30 to be connected are referred to as front ends concerning forward and backward directions parallel with a connecting direction of the two housings 10, 30.

Figure 1:
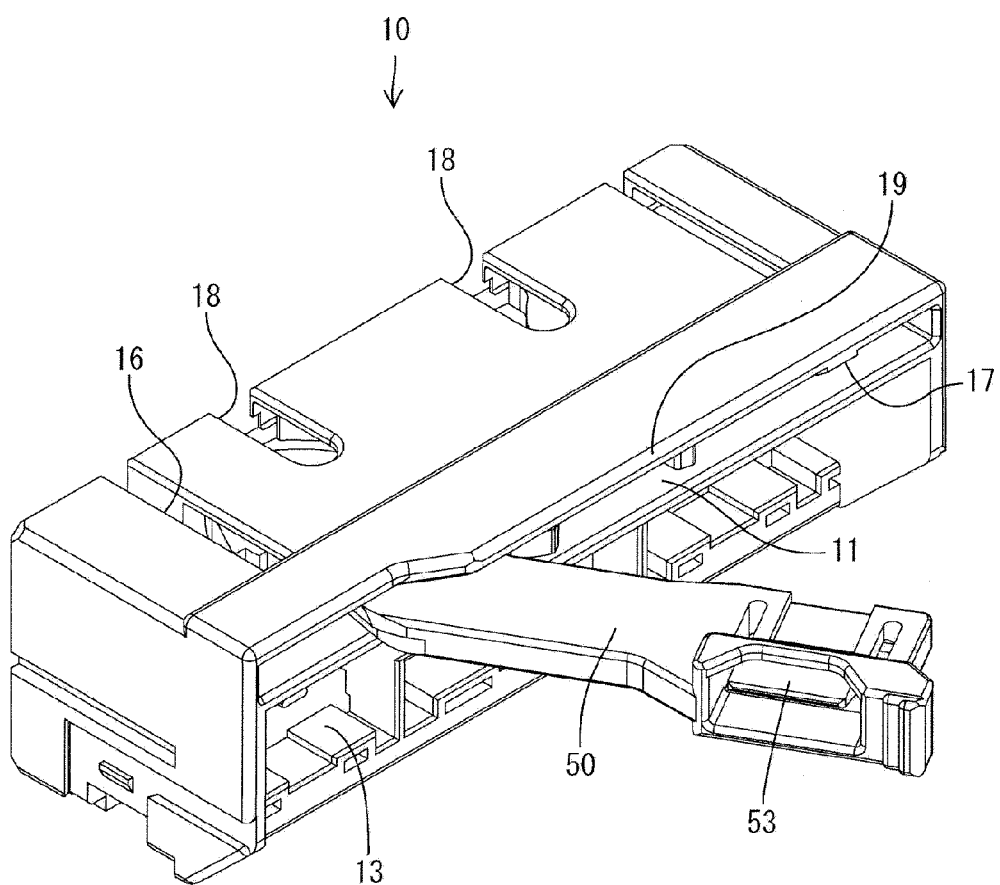
FIG. 1 is a perspective view of a lever-type connector according to one embodiment when viewed obliquely from a rear-upper side.
Figure 2:
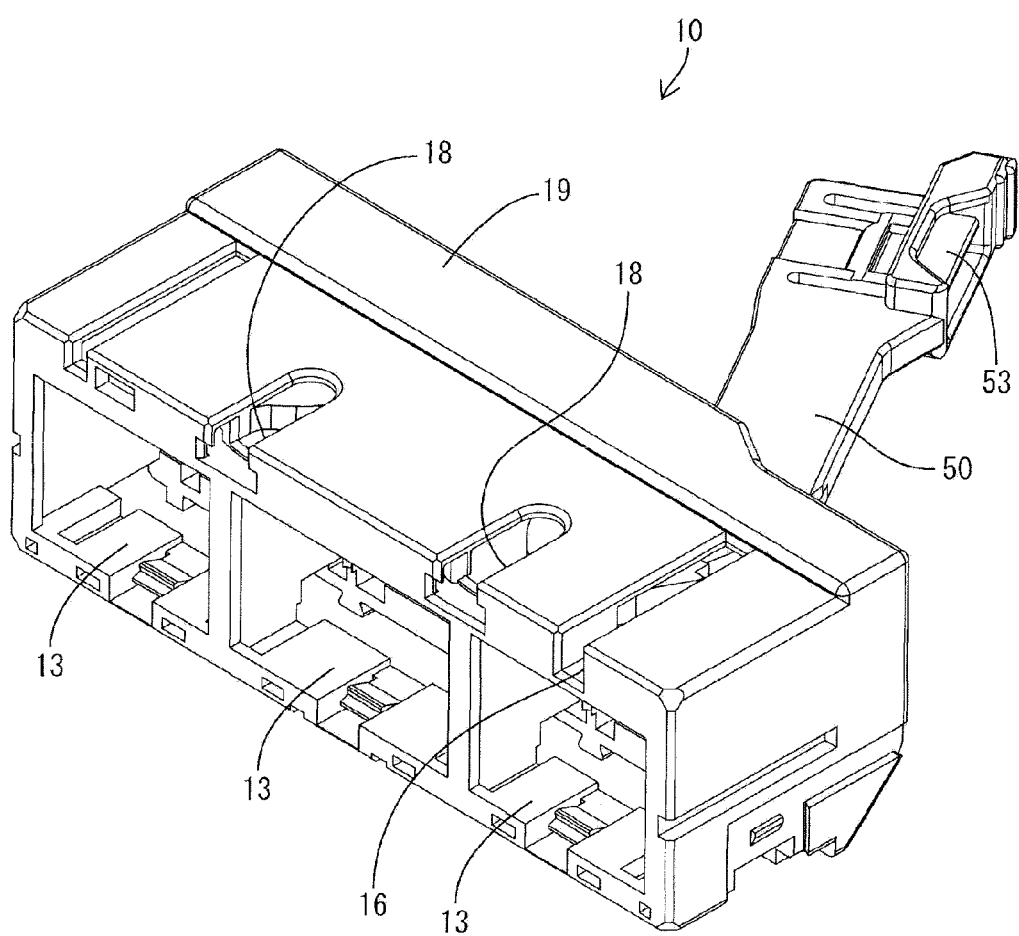
FIG. 2 is a perspective view of the lever-type connector when viewed from a front-upper side.

The male housing 10 is made e.g. of synthetic resin and the front and rear ends have a wide substantially rectangular shape, as shown in FIGS. 1 and 2. An accommodation space 11 is formed at an upper side of the male housing 10 and opens in the rear surface of the male housing 10 for rotatably accommodating the lever 50. Mounting spaces 13 are arranged in a lower part of the accommodation space 11 and open in the front and rear surfaces of the male housing 10 for receiving auxiliary housings (not shown). A male connector is constructed by mounting the auxiliary housings into the male housing 10. It should be understood, however, that the invention also is applicable to a connector with terminal fittings mounted directly into a housing i.e. without auxiliary housings.

Figure 4:
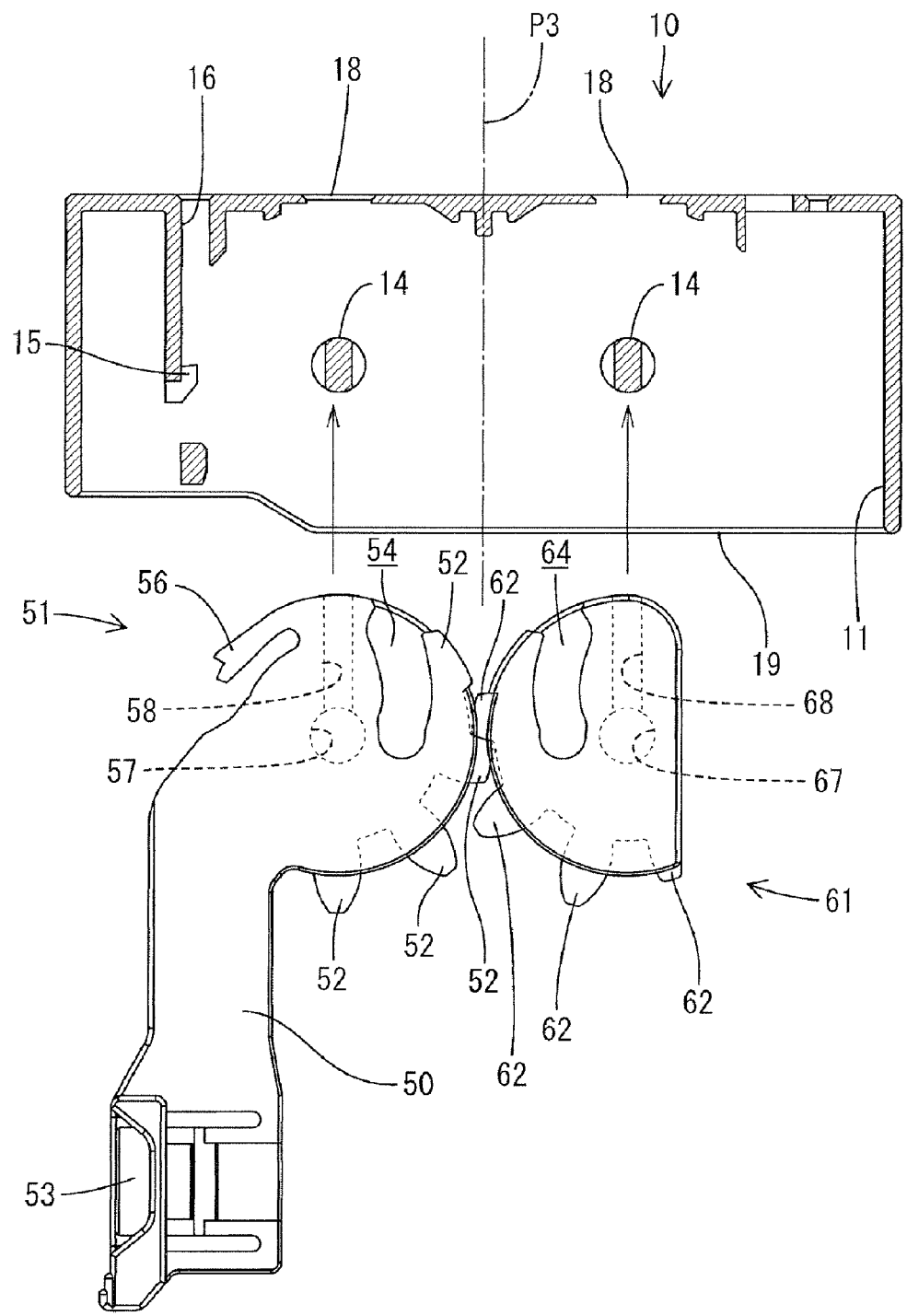
FIG. 4 is a plan view in section showing a state before both gears are assembled into an accommodation space.

As shown in FIG. 4, two supporting pins 14 are formed in the accommodation space 11 for rotatably supporting first and second gears 51 and 61. The lever 50 is rotatable between an initial position IP (FIG. 7) and a connection position CP (FIG. 8) by having the first gear 51 supported by the supporting pin 14. An engaging portion 15 is provided in the accommodation space 11 and a rib insertion hole 16 is formed in a range from the back wall to the upper surface of the accommodation space 11.

Protection walls 19 extend back at parts of the rear opening edge of the accommodation space 11 corresponding to the gears 51, 61, as shown in FIGS. 1, 2 and 4 to 8. The protection walls 19 cover the gears 51, 61 from upper and lower sides and protect the gears 51, 61 from damage due to external impact or the like.

An interlocking portion 17 is provided in the accommodation space 11 of the male housing 10 (see FIG. 1). The interlocking portion 17 engages a lock 53 of the lever 50 when the lever 50 reaches the connection position CP to hold the lever 50 at the connection position CP. The lock 53 can be pressed in a direction intersecting a moving direction of the lever 50 to disengage the lock 53 from the interlocking portion 17. Thus, the lever 50 is freed and can be rotated toward the initial position IP.

Figure 6:
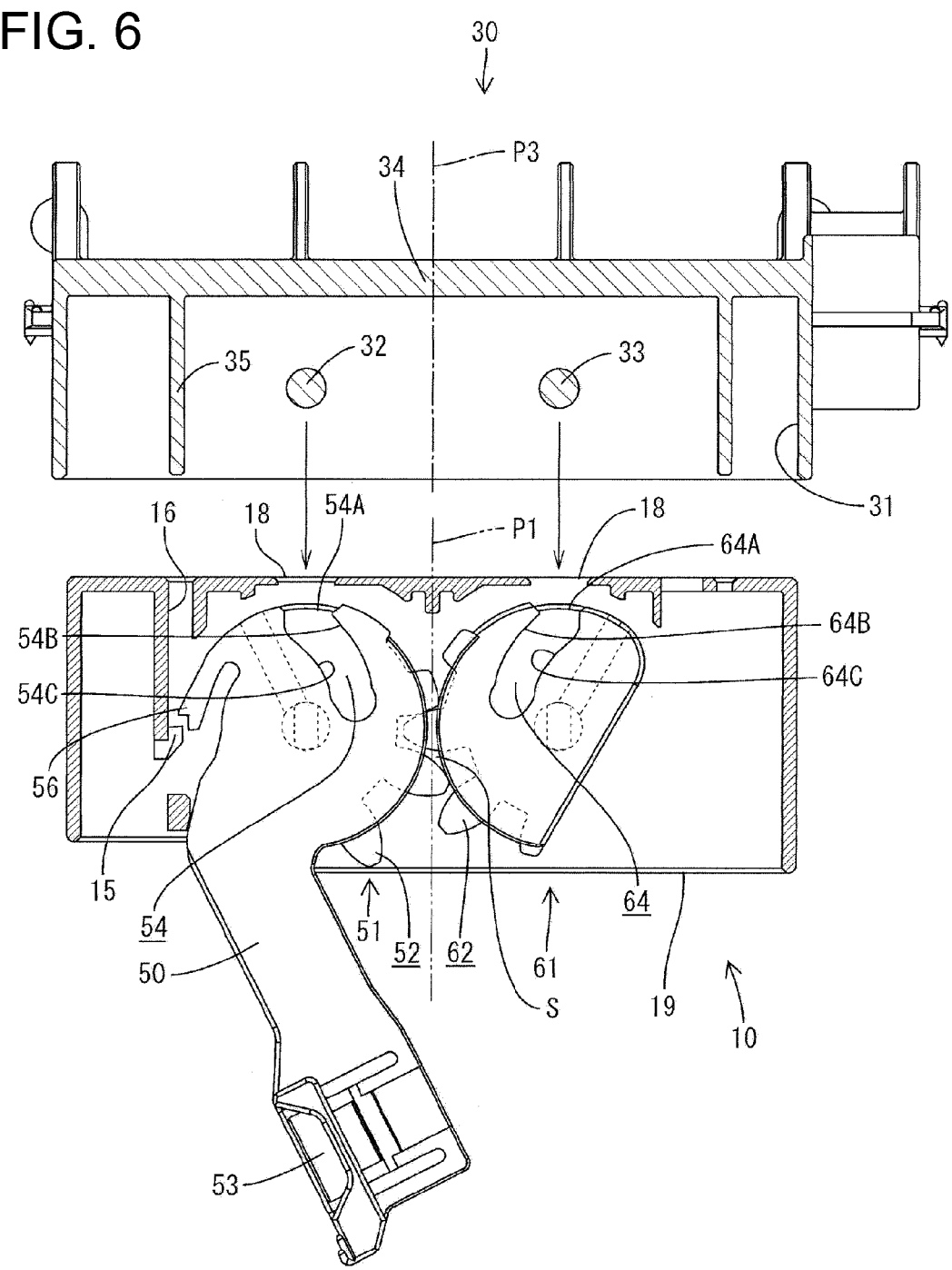
FIG. 6 is a plan view in section showing a state before a male housing is fitted into a receptacle.

The female housing 30 is made e.g. of synthetic resin and includes a forwardly open receptacle 31 (see FIG. 6) that can receive the male housing 10. First and second substantially identical cam pins 32 and 33 are formed on the inner surface of the receptacle 31. As shown in FIG. 6, the cam pins 32, 33 are arranged substantially laterally symmetrically with respect to a plane of symmetry P3 passing the widthwise center of the receptacle 31 in forward and backward directions. The disengaging rib 35 projects forward from a back wall 34 of the receptacle 31.

Figure 3:
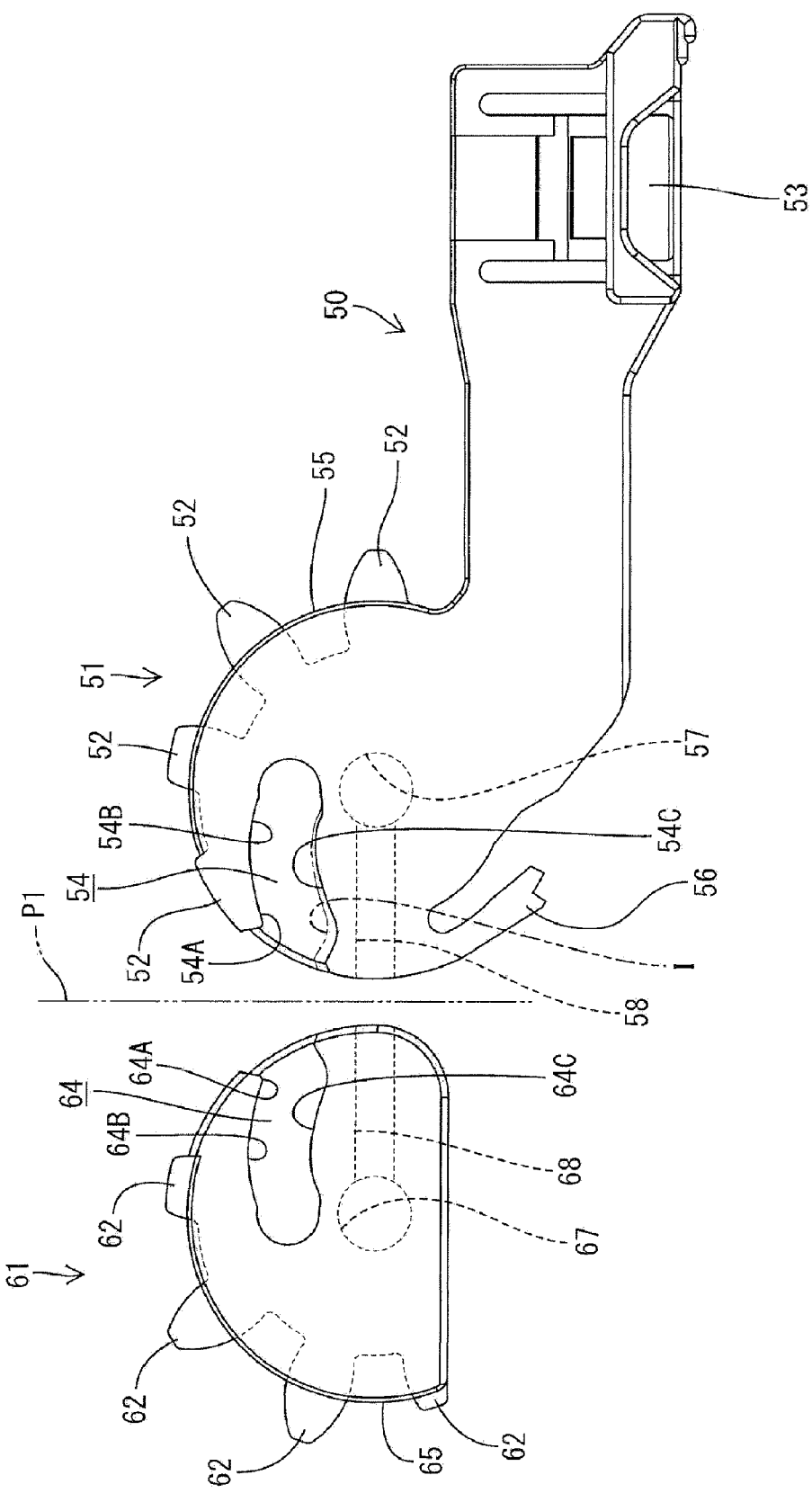
FIG. 3 is a plan view showing a state where both connection surfaces 54B, 64B are symmetrically arranged with respect to a plane of symmetry P1.

As shown in FIG. 3, the first and second gears 51, 61 are substantially symmetrical with respect to a plane of symmetry P1 that is orthogonal to a plane that includes the rotation shafts of the gears 51, 61 and parallel with the connecting direction of the two housings 10, 30. Parts of the second gear 61 common to the first gear 51 are not described and are identified by two digit reference numerals that start with 6 instead of 5. The first gear 51 is unitary with the lever 50. The second gear 61 has no structure comparable to the lever 50 or the stopper 56. However, the second gear 61 is operatively connected with the first gear 51 and is rotated as the first gear 51 is rotated.

The first gear 51 has a substantially semicircular or rounded shape and teeth 52 project from a convexly arcuate outer peripheral part of the first gear 51. The stopper 56 projects at one end of a straight part of the outer periphery of the first gear 51 and functions to stop rotation of the first gear 51. The lever 50 is formed at an end of the convexly arcuate part of the outer periphery of the first gear 51 and projects in a direction substantially opposite to the projecting direction of the stopper 56. Thus, the lever 50 is on a lateral side of the first gear 51 opposite the stopper 56 with respect to a plane passing through an axis of rotation of the first gear 51 and parallel to the connecting direction when the lever 50 is in the connected position shown in FIG. 3. A deformation space for the stopper 56 is radially inwardly of the stopper 56 with respect to the axis of rotation of the first gear 51. An operable portion is formed at the leading end of the lever 50 and is used to rotate the lever 50. The lock 53 is formed at the operable portion.

Figure 7:
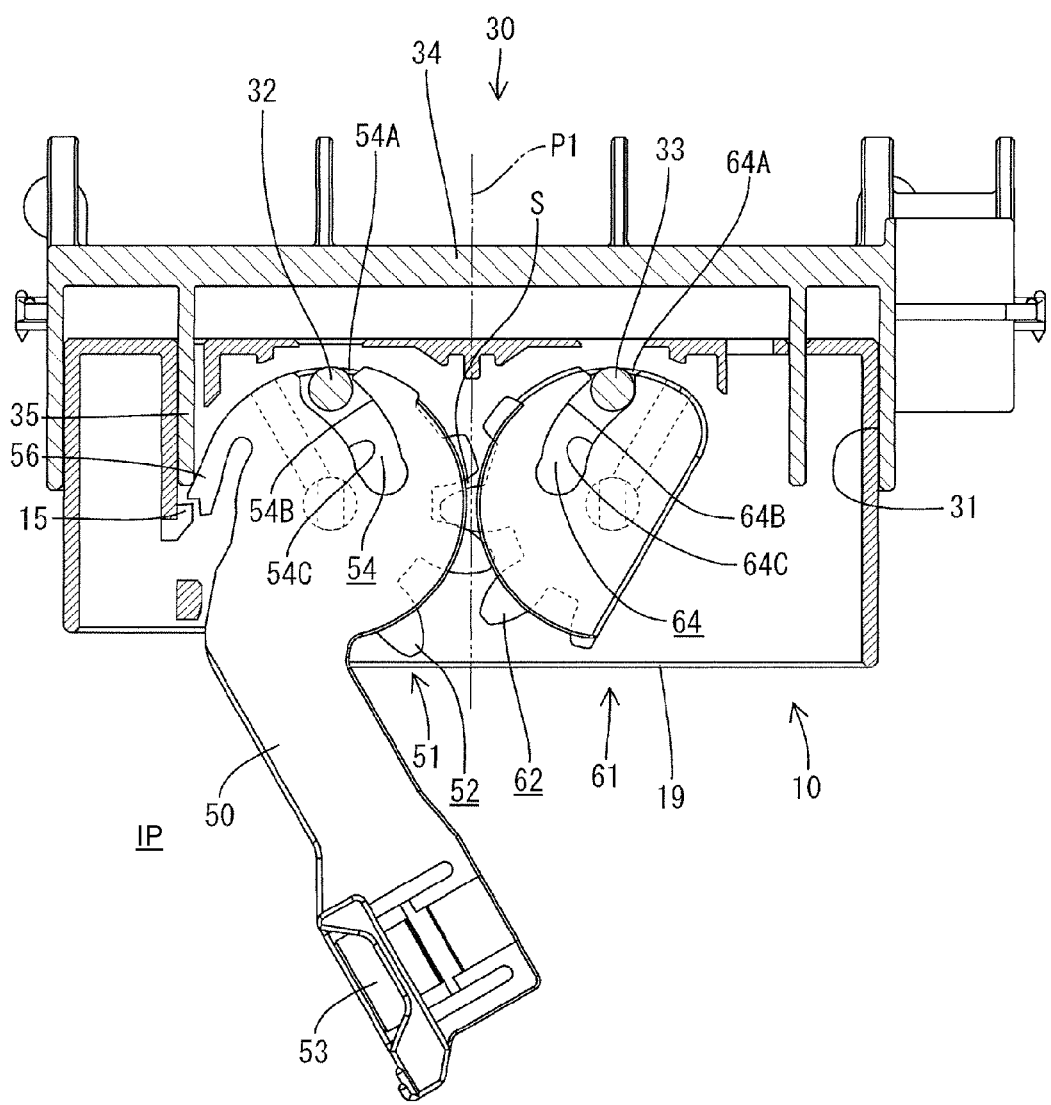
FIG. 7 is a plan view in section showing a state where the male housing is lightly fitted in the receptacle.

The stopper 56 engages the engaging portion 15 when the lever 50 is at the initial position IP, as shown in FIG. 7. Thus, the lever 50 is held at the initial position IP and cannot rotate toward the connection position CP. The disengaging rib 35 enters the male housing 10 through the rib insertion hole 16 and contacts the stopper 56 when the two housings 10, 30 are connected lightly. Hence, the disengaging rib 35 deforms the stopper 56 radially inwardly and disengages the stopper 56 from the engaging portion 15 so that the lever 50 can rotate toward the connection position CP.

A first cam groove 54 is formed in the outer surface of the first gear 51. The first cam groove 54 has a somewhat arcuate or spiral shape with a closed end near the rotation shaft of the first gear 51 and an open entrance 54A at the outer periphery of the first gear 51. Accordingly, a distance from the middle axis of the first cam groove 54 to the axis of rotation of the first gear 51 is variable and steadily or monotonically increases or decreases as a function of the azimuthal angle.

As shown in FIG. 6, two pin insertion holes 18 are formed in a range from the back wall to the upper surface of the accommodation space 11. The pin insertion holes 18 are disposed and dimensioned to receive the cam pins 32, 33. Thus, the cam pins 32, 33 pass through the corresponding pin insertion holes 18 and move into the entrances 54A, 64A of the cam grooves 54, 64 as the two housings 10, 30 are connected.

The teeth 52 of the first gear 51 have base sides coupled to each other by an arcuate flange 55. The flange 55 reinforces the teeth 52 and prevents the teeth 52 from breaking. The first cam groove 54 is at a position substantially corresponding to the flange 55 in a thickness direction of the first gear 51. Thus, the first cam groove 54 and the flange 55 do not to interfere with each other.

A shaft hole 57 is formed at a position of the inner surface of the first gear 51 corresponding to the rotation shaft. Further, a substantially straight guiding groove 58 extends from the shaft hole 57 to the outer periphery of the first gear 51. The guiding groove 58 opens in the inner surface of the first gear 51, but is shallower than the shaft hole 57. Therefore, a step is formed at a boundary between the guiding groove 58 and the shaft hole 57.

Figure 5:
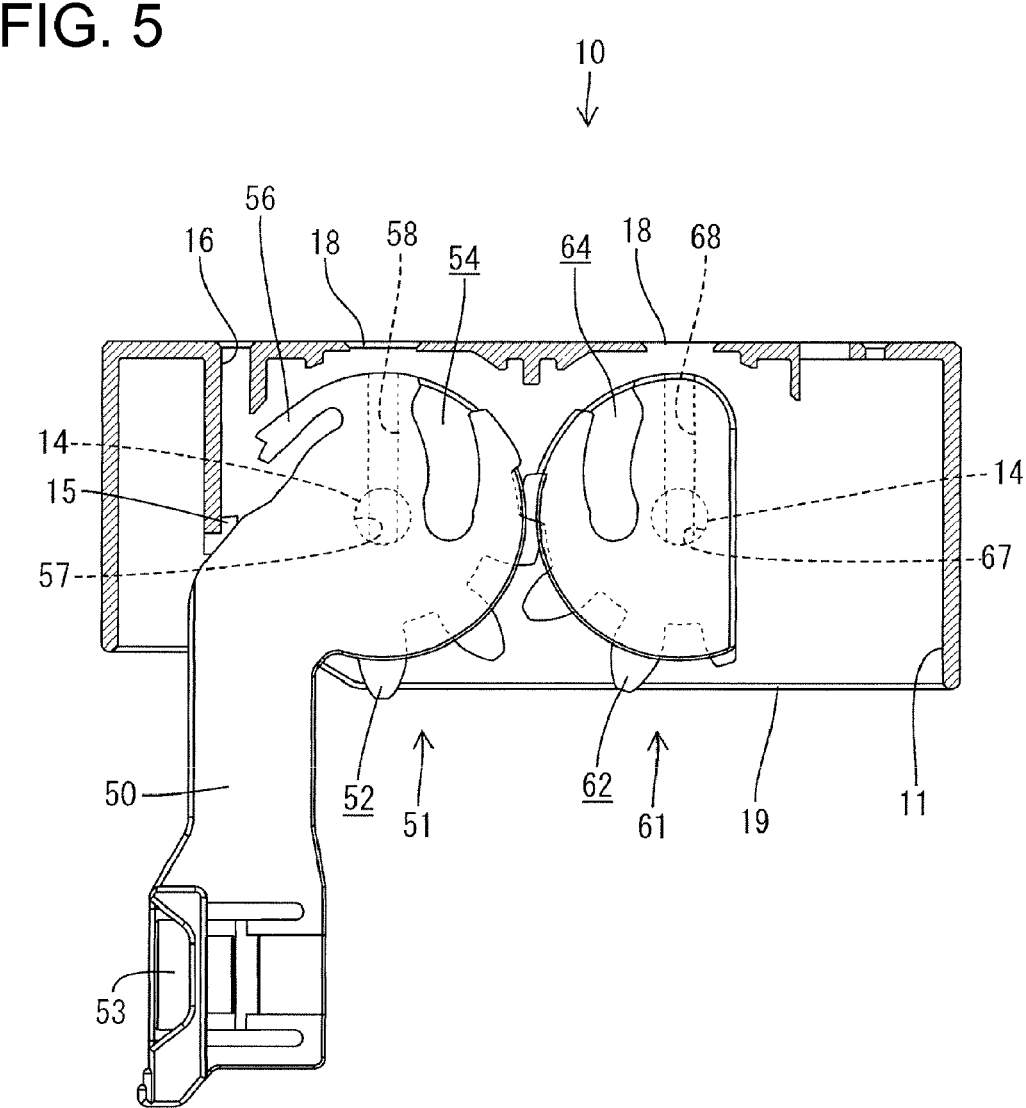
FIG. 5 is a plan view in section showing a state after the both gears are assembled into the accommodation space.

A mounting method of the gears 51, 61 is described with reference to FIGS. 4 and 5. The gears 51, 61 initially are arranged so that the guiding grooves 58, 68 extend substantially parallel to one another in forward and backward directions with the teeth 52, 62 of the gears 51, 61 engaged. The gears 51, 61 then are inserted into the accommodation space 11. As a result, the supporting pins 14 pass through the corresponding guiding grooves 58, 68 and are fit into the corresponding shaft holes 57, 67. The both gears 51, 61 preferably are so held as not to come out by the engagement of the both supporting pins 14 engage the steps at the boundaries between the guiding grooves 58, 68 and the shaft holes 57, 68.

The teeth 52 of the first gear 51 and those 62 of the second gear 61 are formed to be engageable, and the teeth 62 of the second gear 61 are circumferentially displaced from those 52 of the first housing 51. The first gear 51 is formed with a total of four teeth 52 arranged at substantially equal angular intervals in a clockwise direction from the entrance 54A of the first cam groove 54 with the shaft hole 57 as a center. The second gear 61 also is formed with a total of four teeth 62 that are arranged at substantially equal angular intervals in a counterclockwise direction from the entrance 64A of the second cam groove 64 with the shaft hole 67 as a center.

Figure 8:
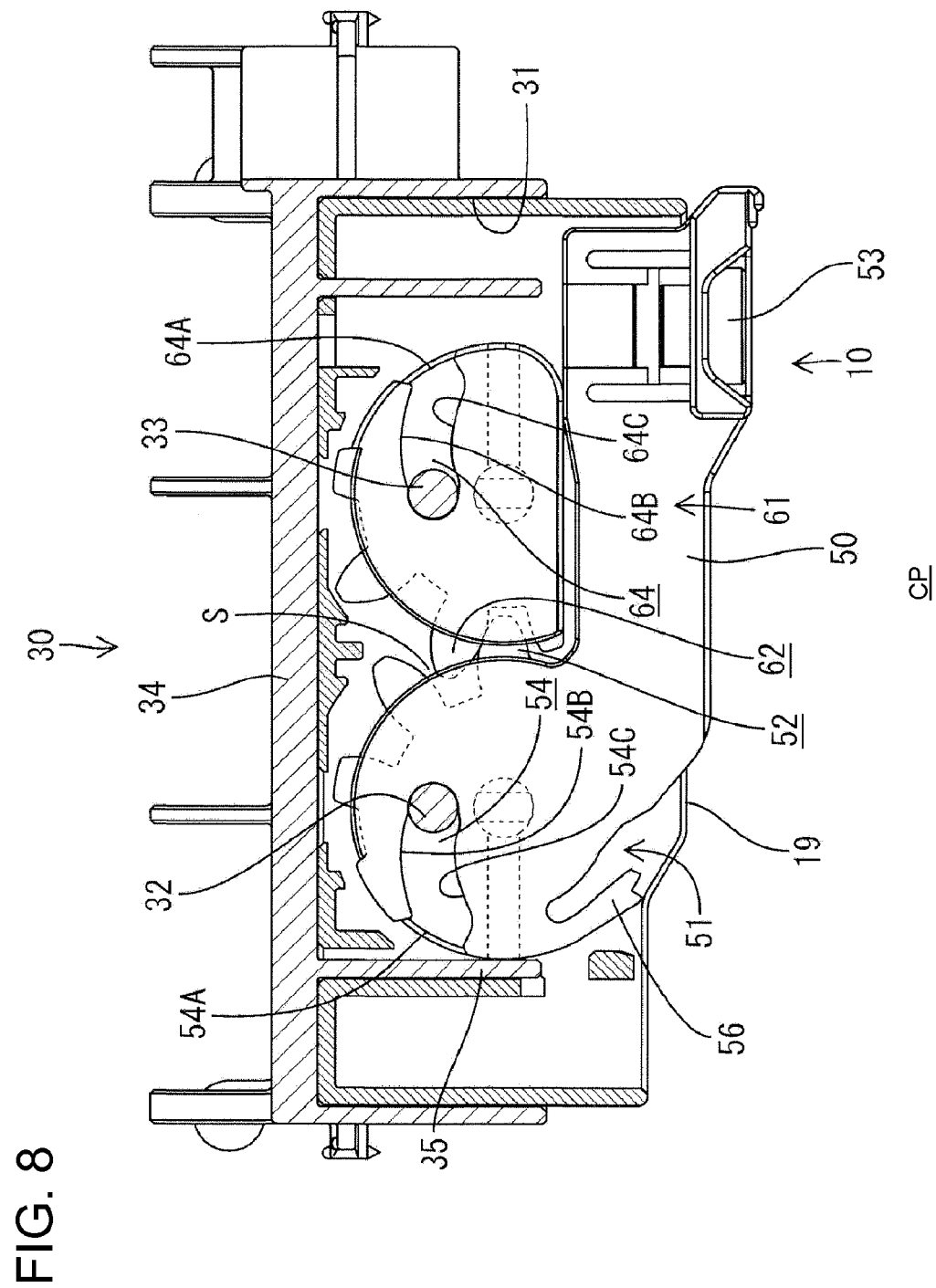
FIG. 8 is a plan view in section showing a connected state of the two housings attained when a lever reaches a connection position.

The two teeth 52 of the first gear 51 closest to the entrance 54A of the first cam groove 54 and the tooth 62 of the second gear 61 closest to the entrance 64A of the second cam groove 64 face the back wall of the accommodation space 11 when the lever 50 reaches the connection position CP, as shown in FIG. 8. The radially outer ends of these teeth 52, 62 that face the back wall of the accommodation space 11 when the lever 50 reaches the connection position CP determine the length of the accommodation space 11 and hence the size of the male housing 10. To help achieve miniaturization, the two teeth 52 of the first gear 51 closest to the entrance 54A of the first cam groove 54 have their radially outer ends cut off to a radial dimension less than the radial dimension of the remaining two teeth 52, and preferably a radial dimension no more than about ⅔ of the radial dimension of the remaining two teeth 52. Similarly, the tooth 62 of the second gear 61 closest to the entrance 64A of the second cam groove 64 has a radially outer end cut off to a radial dimension less than the radial dimension of the adjacent teeth 62 arranged substantially opposite from the entrance 64A of the second cam groove 64, and preferably a radial dimension no more than about ⅔ of the radial dimension of the second and third teeth 62 from the entrance 64A of the second cam groove 64. These short teeth 52, 62 engage each other, as shown in FIG. 4, when the gears 51, 61 are mounted into the accommodation space 11. Additionally, the short teeth 52, 62 face the back wall of the accommodation space 11 when the lever 50 reaches the connection position CP, as shown in FIG. 8, thereby contributing to the miniaturization of the male housing 10.

The second cam groove 64 of the second gear 61 is shaped differently from the first cam groove 54 of the first gear 51. In this embodiment, the width of the first cam groove 54 in a direction orthogonal to a moving direction of the first cam pin 32 is larger than the outer diameter of the first cam pin 32 substantially in conformity with a backlash S between the teeth 52, 62 of the gears 51, 61. On the other hand, the width of the second cam groove 64 in a direction orthogonal to a moving direction of the second cam pin 33 is substantially equal to the outer diameter of the second cam pin 33.

Specifically, the cam grooves 54, 64 are formed respectively with first and second connection surfaces 54B, 64B to be engaged with the cam pins 32, 33 when connecting the two housings 10, 30 and first and second separation surfaces 54C, 64C to be engaged with the cam pins 32, 33 when separating the two housings 10, 30. As shown in FIG. 6, the connection surfaces 54B, 64B are arranged substantially symmetrically with respect to the plane of symmetry P1 when connecting the two housings 10, 30. As noted above, the plane of symmetry P1 is orthogonal to a plane that includes the rotation shafts of the gears 51, 61 and is parallel to the connecting direction of the two housings 10, 30. Accordingly, the connection surfaces 54B, 64B and the cam pins 32, 33 are engaged at the same timing when the lever 50 is rotated, and the two housings 10, 30 are connected while being held in substantially parallel postures by these cam actions.

Figure 9:
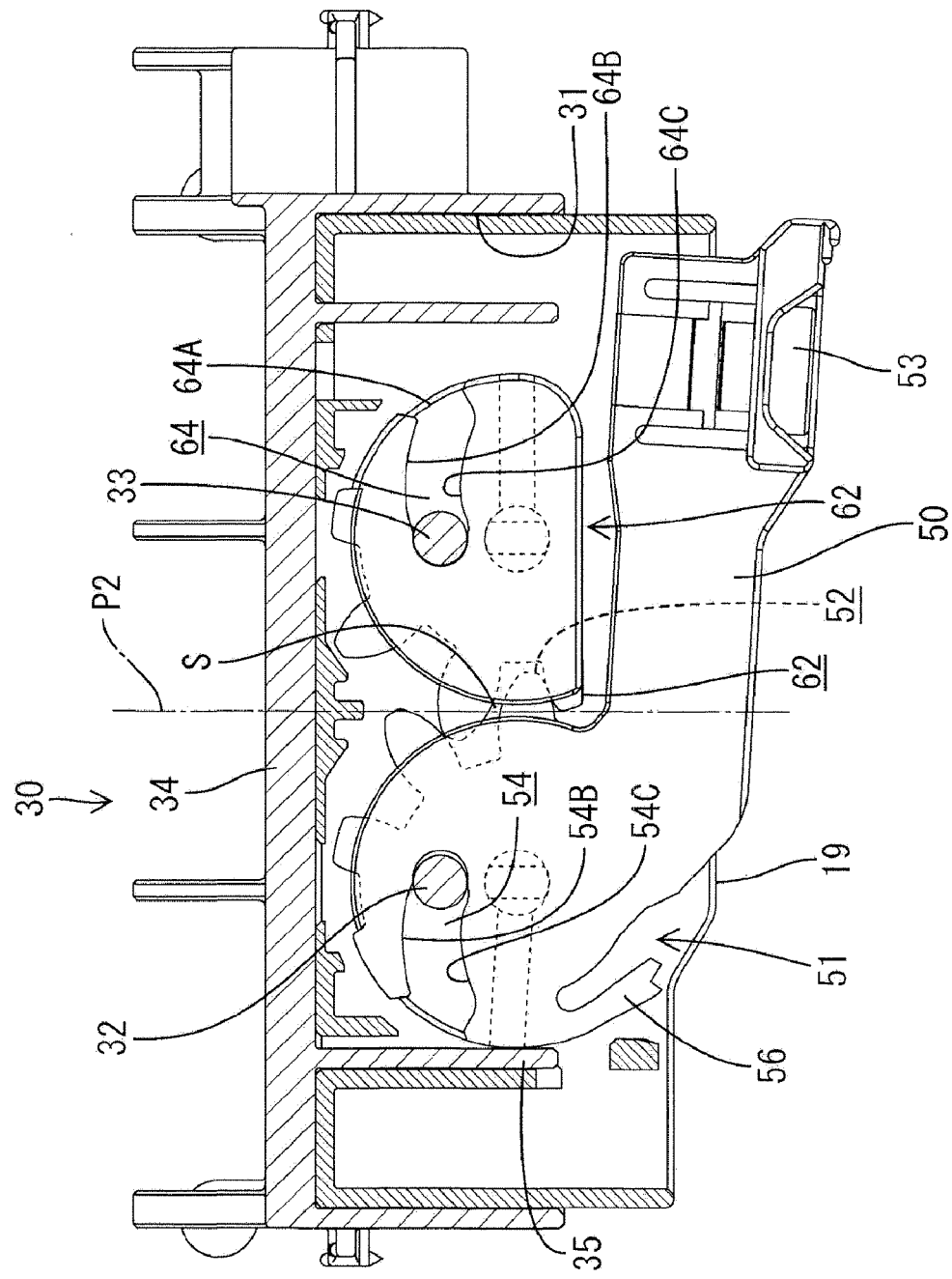
FIG. 9 is a plan view in section showing a state attained by slightly rotating the lever from the connection position toward an initial position by an amount corresponding to a backlash.

On the other hand, the separation surfaces 54C, 64C are arranged symmetrically with respect to a plane of symmetry P2 when separating the two housings 10, 30, as shown in FIG. 9. Accordingly, the separation surfaces 54C, 64C and the cam pins 32, 33 are engaged at the same timing when the lever 50 is rotated and the two housings 10, 30 are separated while being held in parallel postures by these cam actions.

The back ends of the cam grooves 54, 64 engage the corresponding cam pins 32, 33 when the two housings 10, 30 are pulled in separating directions and are aligned to rotate the lever 50 toward the connection position. Thus, the back ends of the cam grooves 54, 64 function as retaining engagement surfaces and prevent separation of the two housings 10, 30.

As shown in FIG. 3, the separation surfaces 54C, 64C are not arranged symmetrically with respect to the plane of symmetry P1 at the time of mounting the gears 51, 61 and at the time of connecting the two housings 10, 30. The chain double-dashed line I in the first cam groove 54 in FIG. 3 is a virtual position of the separation surface 54C that would locate the first and second separation surfaces 54C and 64C substantially symmetrically with respect to the plane of symmetry P1. However, the actual first separation surface 54C is displaced circumferentially about the shaft hole 57 from the virtual plane I and toward the guiding groove 58. This displacement creates the backlash S between the teeth 52, 62 of the gears 51, 61. In other words, upon starting the separation of the two housings 10, 30 in a state where the two housings 10, 30 are connected, as shown in FIG. 8, only the first gear 51 is rotated by as much as the backlash S, as shown by comparing FIGS. 8 and 9. The second gear 61 is not engaged by the first gear 51 from the FIG. 8 position to the FIG. 9 position and, hence, the second gear 61 is not rotated even though the first gear 51 rotates as the lever 50 is rotated. The teeth 52, 62 engage after the first gear 51 is rotated by the amount of the backlash S. Both gears 51, 61 then are rotated with the first gear 51 preceding the second gear 61.

The first separation surface 54C reaches the position of the virtual line I in FIG. 3 after sufficient rotation of the lever 51 and the first gear 51. At this point, the separation surfaces 54C, 64C of the gears 51, 61 are arranged substantially symmetrically with respect to the plane of symmetry P2, as shown in FIG. 9. Thus, the separation surfaces 54C, 64C and the cam pins 32, 33 engage at substantially the same timing and the two housings 10, 30 are separated while being held in substantially parallel postures by these cam actions. Therefore, good lever operability is obtained by avoiding interference of the housings 10, 30.

The gears 51, 61 initially are arranged to engage the short teeth 52, 62 and to align the guiding grooves 58, 68 substantially parallel to one another and along forward and backward directions, as shown in FIG. 4. The engaged gears 51, 61 then are pushed into the accommodation space 11 so that the supporting pins 14 enter the corresponding guiding grooves 58, 68 and fit into the corresponding shaft holes 57, 67, as shown in FIG. 5. The lever 50 then is rotated counterclockwise until the stopper 56 engages the engaging portion 15 to hold the lever 50 at the initial position IP shown in FIG. 6.

The male housing 10 can be fit into the receptacle 31 of the female housing 30 after the gears 51, 61 have been mounted. The disengaging rib 35 in the receptacle 31 enters the male housing 10 through the rib insertion hole 16 and resiliently deforms the stopper 56 in a disengaging direction to disengage the stopper 56 and the engaging portion 15. Simultaneously, the cam pins 32, 33 pass through the pin insertion holes 18 and enter the entrances 54A, 64A of the corresponding cam grooves 54, 64. The lever 50 then is rotated counterclockwise and the connection surfaces 54B, 64B of the cam grooves 54, 64 engage the cam pins 32, 33 substantially at the same time. The resulting cam actions smoothly connect the two housings 10, 30 while being held in substantially parallel postures. The connecting operation of the housings 10, 30 is completed when the lever 50 reaches the connection position CP and the lock 53 engages the interlocking portion 17 to hold the lever 50 at the connection position CP, as shown in FIG. 8.

Figure 10:
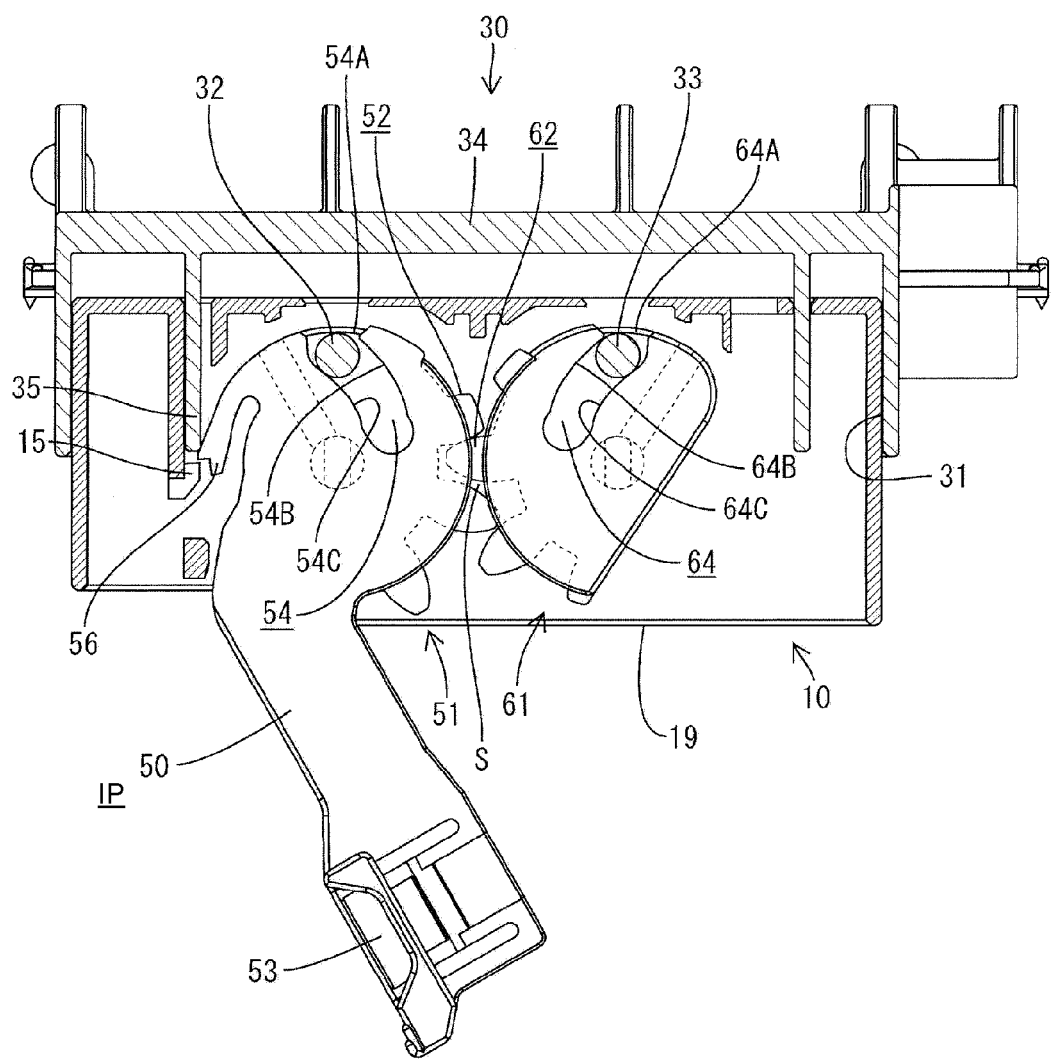
FIG. 10 is a plan view in section showing a state immediately before the lever reaches the initial position.
Figure 11:
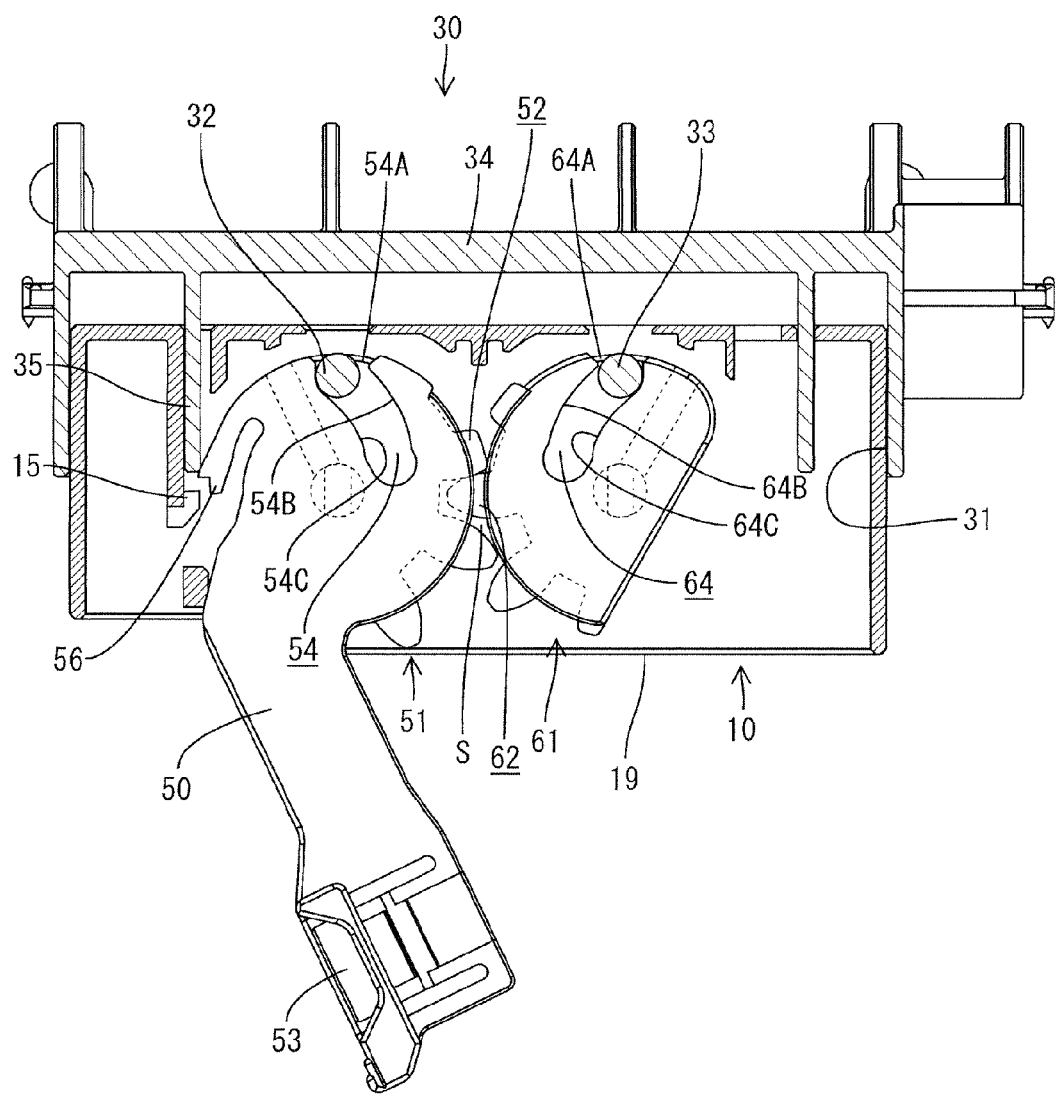
FIG. 11 is a plan view in section showing a separated state of the two housings attained when the lever reaches the initial position.
Figure 12:
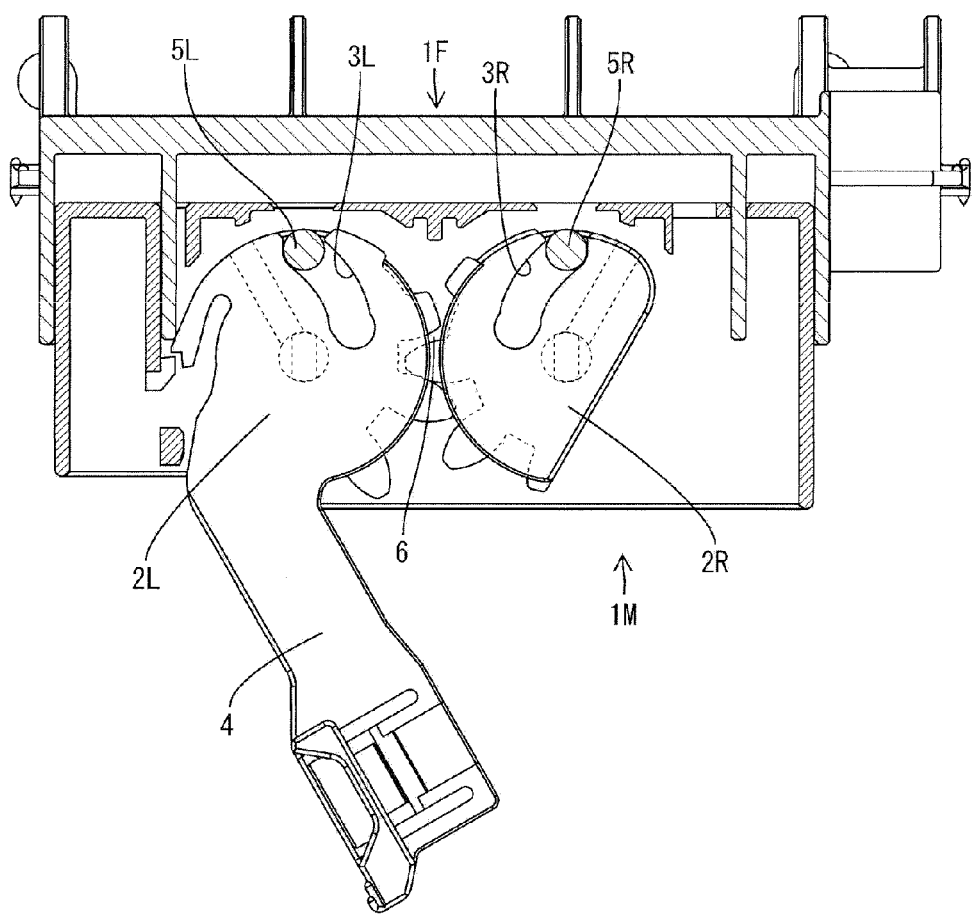
FIG. 12 is a plan view in section showing a state where a male housing is lightly fitted in a receptacle in a conventional lever-type connector.
Figure 13:
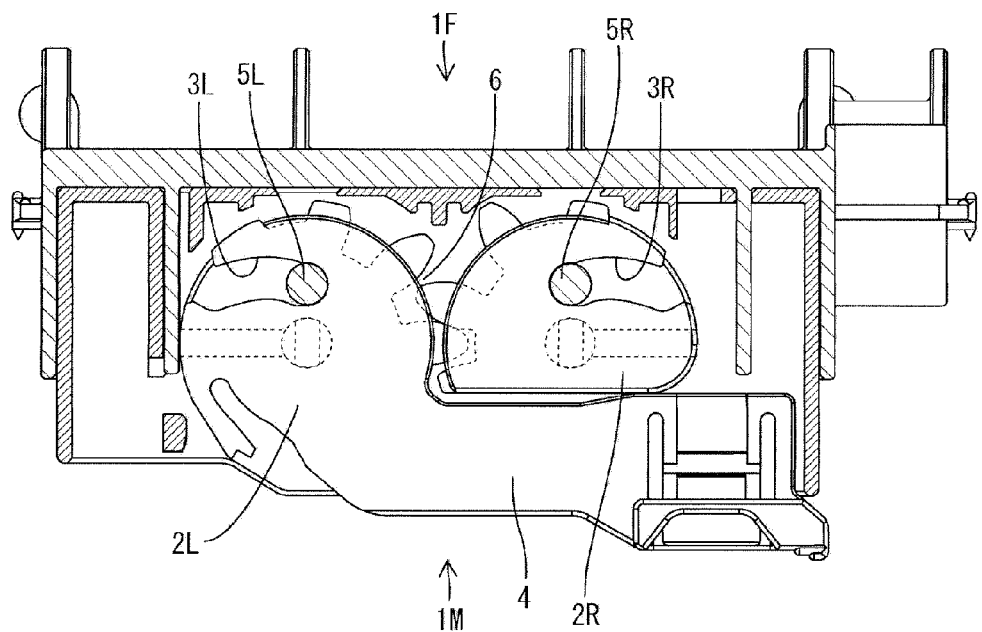
FIG. 13 is a plan view in section showing a state where a lever is rotated to connect two housings.
Figure 14:
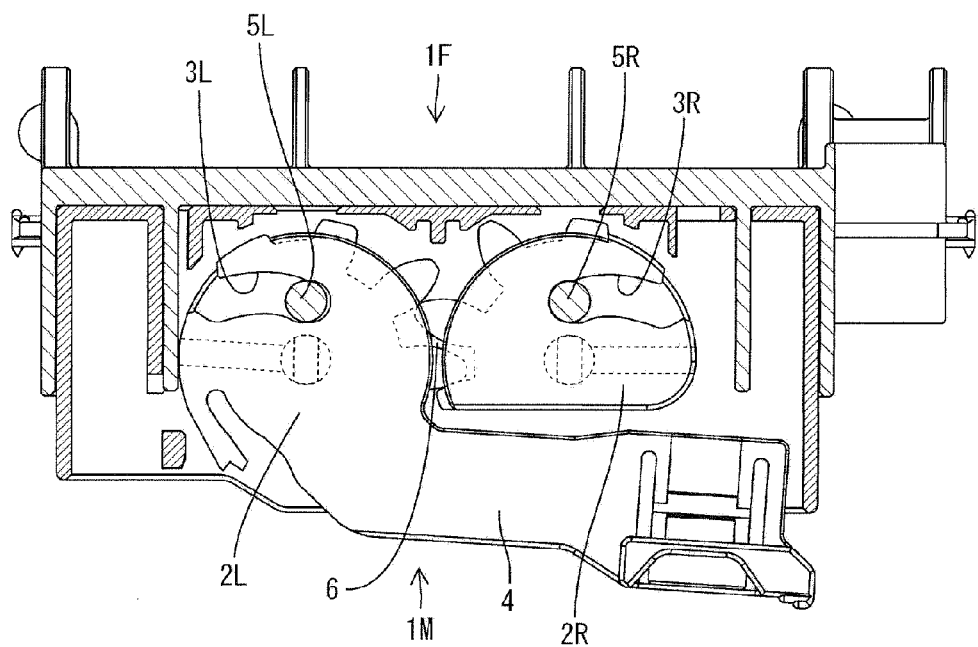
FIG. 14 is a plan view in section showing a state where the lever is slightly rotated by an amount corresponding to a backlash.
Figure 15:
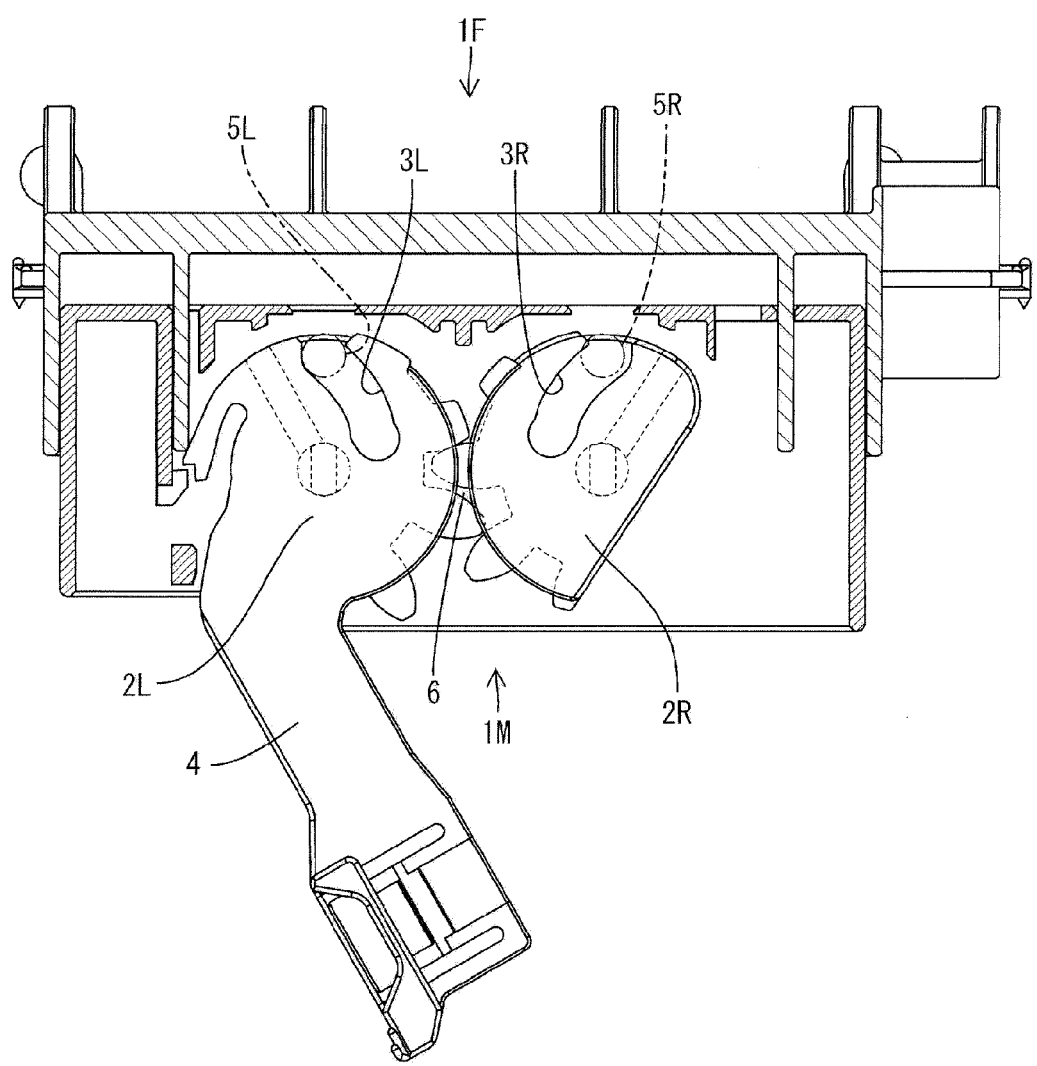
FIG. 15 is a plan view in section showing a state immediately before the two housings are separated.
Figure 16:
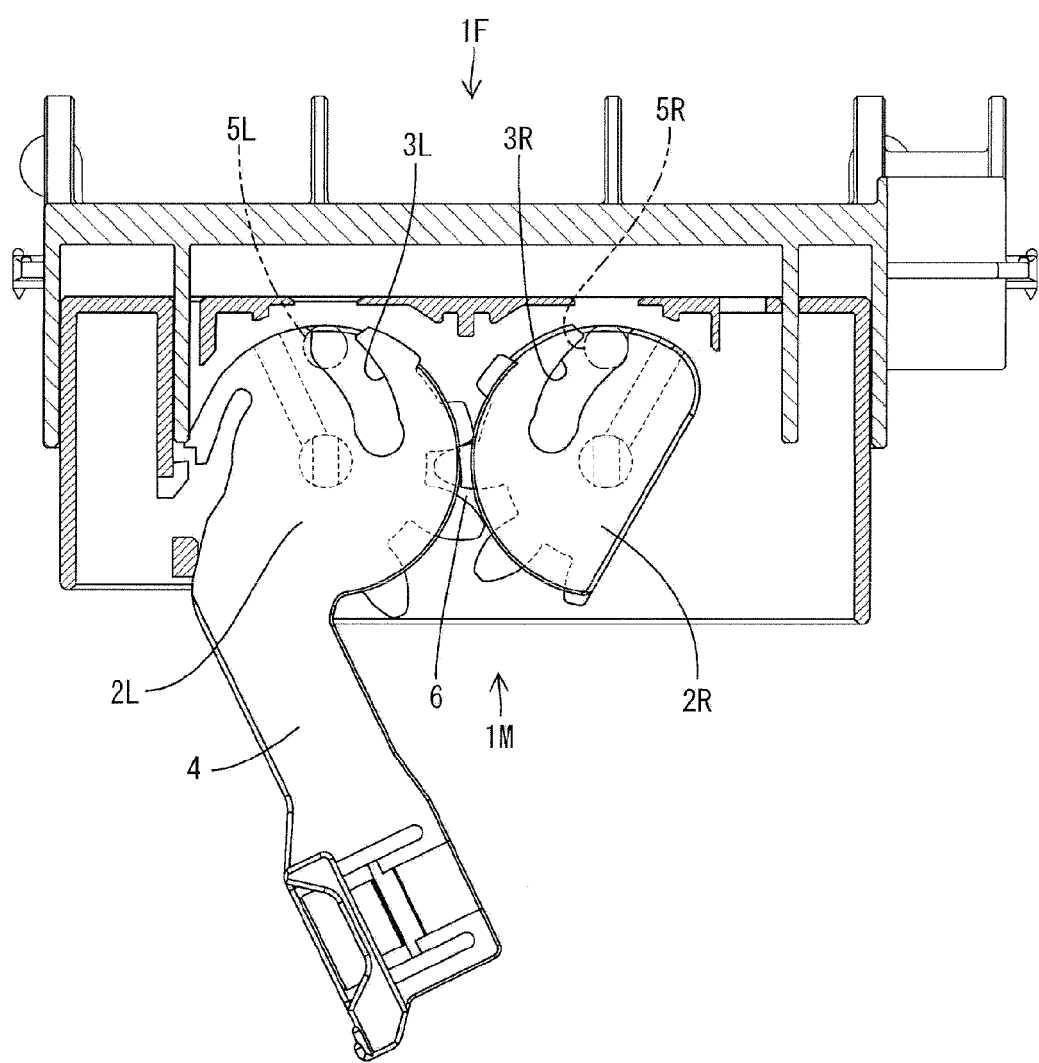
FIG. 16 is a plan view in section showing a separated state of the two housings attained by rotating the lever.

The two housings 10, 30 can be separated by pressing the lock 53 down to cancel the locked state and then rotating the lever 50 clockwise. The initial rotation of the lever 50 causes only the first gear 51 to rotate by the amount of the backlash S, as shown in FIG. 9. As a result, both separation surfaces 54C, 64C become arranged symmetrically with respect to the plane of symmetry P2. Further rotation of the lever 50 causes both gears 51, 61 to rotate and hence causes the first and second separation surfaces 54C, 64C and the first and second cam pins 32, 33 to engage at substantially the same timing. The resulting cam actions cause the housings 10, 30 to be separated smoothly while being held in substantially parallel postures. The separating operation of the housings 10, 30 is completed when the lever 50 reaches the initial position IP, as shown in FIG. 10. In this way, good lever operability is obtained while connecting and separating the housings 10, and while avoiding the interference of the two housings 10, 30.

As described above, only the first gear 51 is rotated by the amount of the backlash S upon an initial rotation of the lever 50 from the connection position CP toward the initial position IP. However, the width of the first cam groove 54 exceeds the outer diameter of the first cam pin 32 in conformity with the backlash S. Thus, both cam pins 32, 33 and both cam grooves 54, 64 can be engaged at the same timing so that the two housings 10, 30 can be connected and separated in parallel postures. Therefore, good lever operability is obtained by avoiding the interference of the two housings 10, 30.

The outer diameters of both cam pins 32, 33 are equal. Hence, it is sufficient to make the first cam groove 54 wider than the second cam groove 64. Further, both connection surfaces 54B, 64B are symmetrical to the plane of symmetry P1, as shown in FIG. 7 at the time of connecting the housings 10, 30 and both separation surfaces 54C, 64C are symmetrical to the plane of symmetry P2, as shown in FIG. 9, at the time of separating the housings 10, 30. Thus, the cam pins 32, 33 can be laterally symmetrical so that the cam pins 32, 33 and the cam grooves 54, 64 engage in a well-balanced manner.

The invention is not limited to the above described embodiment and the following embodiments also are included in the scope of the invention.

The cam grooves 54, 64 are shaped differently in the above embodiment. However, they may be shaped identically and plane-symmetrically. In this case, both cam pins 32, 33 and both cam grooves 54, 64 may be engaged at the same timing by forming the first cam pin 32 with a smaller diameter than the second cam pin 33.

Both cam pins 32, 33 are arranged symmetrically with respect to the planes of symmetry P1, P2 in the above embodiment. However, they may be displaced in forward and backward directions or may not be plane-symmetrically arranged according to the invention.

What is claimed is:

1. A lever-type connector in which a first housing can be connected with and separated from a second housing as a lever is rotated, comprising:
   first and second cam pins projecting on the first housing;
   a first gear rotatably mounted on the second housing and being rotatable as the lever is rotated, the first gear being engageable with the first cam pin; and
   a second gear rotatably mounted in the second housing and being rotatable as the first gear is rotated, the second gear being engageable with the second cam pin;
   wherein a first cam groove has a width in a direction orthogonal to a moving direction of the first cam pin that exceeds an outer diameter of the first cam pin in conformity with a backlash between the two gears, and the second cam groove has a width in a direction orthogonal to a moving direction of the second cam pin that is substantially equal to an outer diameter of the second cam pin.

2. The lever-type connector of claim 1, wherein the outer diameters of the cam pins are equal.

3. The lever-type connector of claim 1, wherein the first and second gears are formed substantially symmetrically with respect to a plane of symmetry orthogonal to a plane that includes rotation shafts of the gears and in parallel with the connecting direction of the two housings.

4. The lever-type connector of claim 1, wherein each of the cam grooves has a connection surface to be engaged with the corresponding cam pin when connecting the housings and a separation surface to be engaged with the corresponding cam pin when separating the housings, the connection surfaces being disposed substantially symmetrically on opposite sides of a plane of symmetry orthogonal to a plane that includes rotation shafts of the gears and parallel with a connecting direction of the housings when connecting the housings and the separation surfaces being arranged substantially symmetrically on opposite sides of the plane of symmetry when separating the two housings.

5. The lever-type connector of claim 4, wherein the separation surfaces are not arranged symmetrically with respect to the plane of symmetry when mounting the gears and when connecting the housings.

6. The lever-type connector of claim 1, wherein the first gear has first teeth arranged successively in a first azimuthal direction from a first entrance of the first cam groove and the second gear has second teeth arranged in a second azimuthal direction from a second entrance of the second cam groove.

7. The lever-type connector of claim 6, wherein at least one of the first teeth adjacent to the first entrance is a short first tooth having a radial projecting distance that is less than at least one other of the first teeth and at least one of the second teeth adjacent to the second entrance is a short second tooth having a radial projecting distance that is less than at least one other of the second teeth.

8. The lever-type connector of claim 7, wherein the short first and second teeth are arranged to face a back wall of an accommodation space of the housing when the lever reaches a connection position where the housings are connected.

9. The lever-type connector of claim 1, wherein the lever is unitary with the first gear.

10. The lever-type connector of claim 1, wherein a stopper projects from an outer periphery of the first gear for stopping the rotation of the first gear.

11. A lever-type connector, comprising:
a first housing;
a second housing configured to be connected with and separated from the first housing, the second housing being formed with first and second cam pins;
a lever mounted rotatably on the first housing;
a first gear integral with the lever and being rotatable as the lever is rotated, the first gear having a first cam groove that is engageable with the first cam pin and having first teeth; and
a second gear rotatably mounted in the first housing and having second teeth that are engageable with the first teeth so that the second gear is rotatable as the first gear is rotated, the second gear having a second cam groove that is engageable with the second cam pin has a width in a direction orthogonal to a moving direction of the first cam pin that exceeds an outer diameter of the first cam pin in conformity with a backlash between the two gears, and the second cam groove has a width in a direction orthogonal to a moving direction of the second cam pin that is substantially equal to an outer diameter of the second cam pin.

12. The lever-type connector of claim 11, wherein the outer diameters of the cam pins are equal.

13. The lever-type connector of claim 11, wherein each of the cam grooves has a connection surface to be engaged with the corresponding cam pin when connecting the housings and a separation surface to be engaged with the corresponding cam pin when separating the housings, the connection surfaces being disposed substantially symmetrically on opposite sides of a plane of symmetry orthogonal to a plane that includes rotation shafts of the gears and parallel with a connecting direction of the housings when connecting the housings and the separation surfaces being arranged substantially symmetrically on opposite sides of the plane of symmetry when separating the two housings.

14. The lever-type connector of claim 13, wherein the separation surfaces are not arranged symmetrically with respect to the plane of symmetry when mounting the gears and when connecting the housings.

15. The lever-type connector of claim 11, wherein the first gear has first teeth arranged successively in a first direction from a first entrance of the first cam groove and the second gear has second teeth arranged in a second direction from a second entrance of the second cam groove, at least the first tooth adjacent to the first entrance has a radial projecting distance less than at least one other of the first teeth and at least the second tooth adjacent to the second entrance has a radial projecting distance that is less than at least one other of the second teeth.

16. A lever-type connector, comprising:
a first housing;
a second housing configured to be connected with and separated from the first housing, the second housing being formed with first and second cam pins;
a lever mounted rotatably on the first housing;
a first gear integral with the lever and being rotatable as the lever is rotated, the first gear having a first cam groove that is engageable with the first cam pin and having first teeth, the first cam groove having a first width; and
a second gear rotatably mounted in the first housing and having second teeth that are engageable with the first teeth so that the second gear is rotatable as the first gear is rotated, the second gear having a second cam groove that is engageable with the second cam pin, the second cam groove having a second width that is less than the first width by a distance in conformity with a backlash between the gears.

17. The lever-type connector of claim 16, wherein the outer diameters of the cam pins are equal.

18. The lever-type connector of claim 16, wherein each of the cam grooves has a connection surface to be engaged with the corresponding cam pin when connecting the housings and a separation surface to be engaged with the corresponding cam pin when separating the housings the connection surfaces being disposed substantially symmetrically on opposite sides of a plane of symmetry orthogonal to a plane that includes rotation shafts of the gears and parallel with a connecting direction of the housings when connecting the housings and the separation surfaces being arranged substantially symmetrically on opposite sides of the plane of symmetry when separating the two housings.

19. The lever-type connector of claim 18, wherein the separation surfaces are not arranged symmetrically with respect to the plane of symmetry when mounting the gears and when connecting the housings.

20. The lever-type connector of claim 16, wherein the first gear has first teeth arranged successively in a first direction from a first entrance of the first cam groove and the second gear has second teeth arranged in a second direction from a second entrance of the second cam groove, at least the first tooth adjacent to the first entrance has a radial projecting distance less than at least one other of the first teeth and at least the second tooth adjacent to the second entrance has a radial projecting distance that is less than at least one other of the second teeth.

* * * * *